United States Patent [19]
Evans et al.

[11] Patent Number: 5,189,808
[45] Date of Patent: Mar. 2, 1993

[54] MEASUREMENT GAUGE

[75] Inventors: Michael D. Evans, Kent; Curtis L. Gnagy, Renton; William F. Herold, Kirkland; Christopher W. Lagerberg, Seattle; Bruce W. Nelson, Renton, all of Wash.

[73] Assignee: The Boeing Company, Seattle, Wash.

[21] Appl. No.: 709,927

[22] Filed: Jun. 3, 1991

[51] Int. Cl.$^5$ .............................. G01B 3/56
[52] U.S. Cl. ........................ 33/836; 33/542
[58] Field of Search .............. 33/836, 832, 833, 556, 33/559, 542, 531, DIG. 18, 557, 560, 543

[56] References Cited

U.S. PATENT DOCUMENTS

| | | | |
|---|---|---|---|
| 1,928,528 | 9/1933 | Gagnon | 33/542 |
| 2,212,306 | 8/1940 | Schwartz | 33/542 |
| 2,498,969 | 2/1950 | Vobeda | 33/836 |
| 2,517,846 | 8/1950 | Craig | 33/542 |
| 2,583,791 | 9/1952 | Neff . | |
| 2,642,670 | 6/1953 | Dow | 33/832 |
| 2,663,946 | 12/1953 | Wojcik | 33/542 |
| 2,758,382 | 8/1956 | Hurd | 33/836 |
| 2,975,524 | 3/1961 | Field | 33/542 |
| 3,116,560 | 1/1964 | Matthews | 33/542 |
| 3,193,937 | 7/1965 | Aller . | |
| 3,269,019 | 8/1966 | Krohn | 33/836 |
| 3,855,708 | 10/1972 | Tann et al. . | |
| 3,919,776 | 11/1975 | Upton | 33/531 |
| 4,616,420 | 5/1985 | Golinelli . | |
| 4,753,555 | 6/1988 | Thompson et al. | 33/542 |
| 4,905,378 | 3/1990 | Culver et al. | 33/836 |

OTHER PUBLICATIONS

8703 X Gauge Drawing FIGS. 7 & 8 (data unknown).

Primary Examiner—William A. Cuchlinski, Jr.
Assistant Examiner—C. W. Fulton
Attorney, Agent, or Firm—J. Michael Neary; B. A. Donahue

[57] ABSTRACT

A gauge for measuring the depth of a hole countersink in a workpiece for a fastener, or for measuring the protrusion height of a fastener head above the surface of the workpiece, includes a tapered cylindrical case for holding a transducer such as an LVDT, and a probe assembly removably mounted on the lower end of the case. The probe assembly includes a foot having an annular contact ring at its lower end for contacting the workpiece around the hole or around the fastener head to establish the reference position from which the measurement is to be taken. A probe is mounted in a well in the foot for axial sliding movement therein and is captured within the food by a connector which is screwed onto the upper end of the foot. The connector screws into the lower end of the case and a stud of the LVDT extends through a bore in the end of the case and the connector to contact the top end of the probe on measure the axial position of the probe while it is sensing the countersink depth or the fastener head protrusion. A cable connects the LVDT to a digital indicator to provide a readout of the measurement taken.

20 Claims, 4 Drawing Sheets

MEASUREMENT GAUGE

BACKGROUND OF INVENTION

This invention relates to fastening, and more particularly to a probe and method for measuring the countersink depth of countersunk holes for fasteners, and also to a probe and method for measuring the protrusion height of fasteners above the surface of a workpiece.

A commercial jet liner subject to a high rate of take off and landing cycles is exposed to a stress cycle caused by repeated pressurizing and depressurizing of the fuselage as the plane ascends to cruising altitude and then descends to land. The stresses which are basically hoop stresses on the fuselage caused by internally pressurizing the fuselage for passenger comfort, and radial stresses caused by differential pressure on the fuselage panels, tend to be concentrated at the rivet points and are transmitted between the rivets and the rivet skin at the margins of the rivet holes.

To maximize the service lifetime of such an airplane, it is desirable to ensure that the rivet holes be designed to maximize the fatigue resistance of the skin in the region of the rivet holes to minimize or prevent the formation of fatigue cracks in the airplane skin. This is particularly important in the fuselage skin which is normally made fairly thin to minimize weight.

A Briles rivet, as shown in U.S. Pat. No. 4,159,666, includes a head having a cylindrical section ("barrel") and a tapered section, and a cylindrical shank projecting from the tapered section. The purpose of the barrel is to seal the rivet head in the counterbore of the rivet hole when the rivet is upset to prevent entrance of water between the rivet head and the rivet hole which could cause corrosion and staining of the exterior of the fuselage. An even more important function of the Briles rivet head barrel is to cold work the skin material in the marginal regions of the rivet hole to strengthen and harden the material to improve the fatigue resistance to cracking. Without this cold working, the fuselage skin would have to be substantially thicker to provide the desired fatigue resistance.

Use of the Briles rivet on a thin skin fuselage panel requires that the depth of the hole counterbore and the countersink be precisely accurate. If the countersink is too deep, it could form a "knife-edge" condition at the bottom of the countersink and the bottom or inside face of the skin which can lead to the initiation of a fatigue crack at the "knife edge". If the countersink is too shallow, the barrel of the rivet head will protrude from the counterbore of the rivet hole into the airstream and create unacceptably high drag. For this reason, rivet holes are drilled with extremely accurate tooling to ensure that the holes are the correct diameter and depth.

Even with the precision tooling in use for drilling accurate holes, it is desirable for statistical process control and other purposes to measure the depth of a rivet hole countersink. The most widely used procedure is to insert a rivet in the rivet hole and measure the protrusion of the rivet head out of the hole before the rivet is upset. This technique occasionally fails to detect a too-deep countersink when the thickness of the rivet head itself exceeds the tolerance and conceals the fact that the rivet hole countersink is too deep. As a back-up quality control technique, the height of the rivet protrusion from the rivet hole is ascertained after the rivet has been upset. If it is flush with or below the skin surface, the rivet hole countersink is presumed to be too deep and a repair is made. However, a too-deep hole and a too-thick head will combine to defy detection by these two measurement techniques.

To ensure that the rare coincidence of a too-deep rivet hole and a too-thick rivet head do not go undetected, it would be desirable to be able to measure the depth of a rivet hole countersink directly. It would seem that the depth measurement could be made easily merely by inserting a probe into the hole and measuring the depth of penetration to the bottom of the countersink, but this seemingly straightforward task is actually more complicated than it first appears. The depth of penetration of the probe is a function of the probe diameter, since the surface it contacts is a tapered surface. Also, the hole countersink is blended into the counterbore and the shank bore with radiused transition regions which should not be contacted for depth measurement. Finally, the tolerances of the countersink angle, the skin thickness, the counterbore and shank bore diameters and the probe diameter, as well as the measurement accuracy of the instrument transducer must be considered in individual and stacked fashion to ensure that a hole depth measured at the limit of all the tolerances involved and appearing to fall within the permitted range does in fact leave sufficient shank bore depth to the enable the rivet hole to have the required fatigue resistance.

A typical riveted structure, such as an airplane, has countersunk rivets of numerous sizes, so a countersink depth gauge of maximum usefulness should have the capability to measure more than one size rivet hole, and preferably all the rivet holes that are used on the structure. Because of the requirement that the probe directly contact the tapered countersink surface, it would seem to be a logical solution to use a separate probe for each size rivet hole. However, a depth gauge provided with replacable probes must be accurate for all size holes, and that accuracy must not be compromised by the act of exchanging probes for measuring different size holes.

The protrusion of a fastener head above the surface of the airplane is an important factor in the performance and structural integrity of the airplane structure. If the fastener head, of rivets in particular, is flush with or below the skin surface, there is no certainty that there is adequate interfacial pressure under the fastener head. If the fastener head protrudes excessively above the skin surface, the aerodynamic drag becomes significant. The trends in fastener head protrusion between the two tolerance limits can be a useful analytic tool for manufacturing quality control. For these reasons, a gauge for measuring fastener head protrusion would be a valuable tool, especially if that gauge could be based on the same tool used to measure the countersink depth of the fastener head.

SUMMARY OF THE INVENTION

Accordingly, it is an object of this invention to provide an improved gauge for measuring the depth of a countersunk hole for a fastener, wherein the hole depth can be measured directly.

Another object of the invention is to provide an improved method of measuring the depth of a countersink of a hole for a fastener, which ensures that the hole countersink is measured accurately and gives repeatable, reproducable results dependably by all operators of the gauge.

A further object of this invention is to provide an improved gauge for measuring the protruding height of a fastener head after it had been fastened.

Still another object of this invention is to provide an improved method of measuring the countersink depth of a fastener hole, and the height of a protruding fastener head.

These and other objects of the invention are attained in a gauge for measuring the depth of a fastener hole countersink and the height of a protruding fastener head. The gauge includes a case for holding a transducer, and a replaceable probe assembly that attaches to the case. An axially slidable probe in the probe assembly has a flat upper surface that contacts a moveable tip of the transducer. The distal end of the probe extends through a foot in contact with the surface of the skin to establish the reference from which the measurement is taken. The probe contacts the countersink of the fastener hole or the surface of the protruding fastener head to indicate the location of the surface of interest. The probe height is sensed by the transducer tip and is measured by the transducer. An electrical signal produced by the transducer is displayed on a digital indicator screen.

DESCRIPTION OF THE DRAWINGS

The invention and its many attendant objects and advantages will become more clear upon reading the following description of the preferred embodiment, in conjunction with a perusal of the following drawings, wherein.

DESCRIPTION OF THE PREFERRED EMBODIMENT

Figure 1:
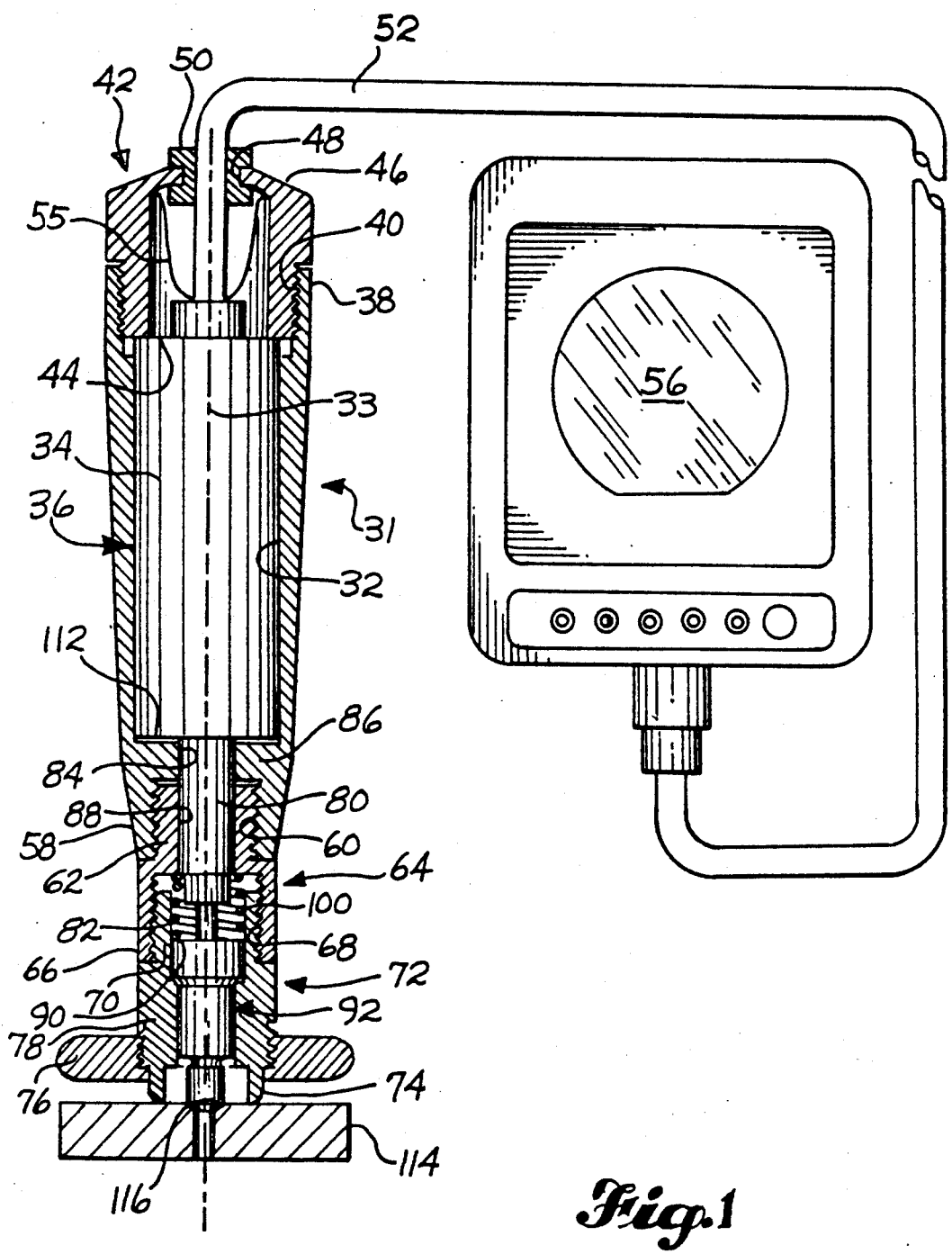
FIG. 1 is a cross sectional elevation of a countersink depth gauge and digital indicator according to the invention.
Figure 2:
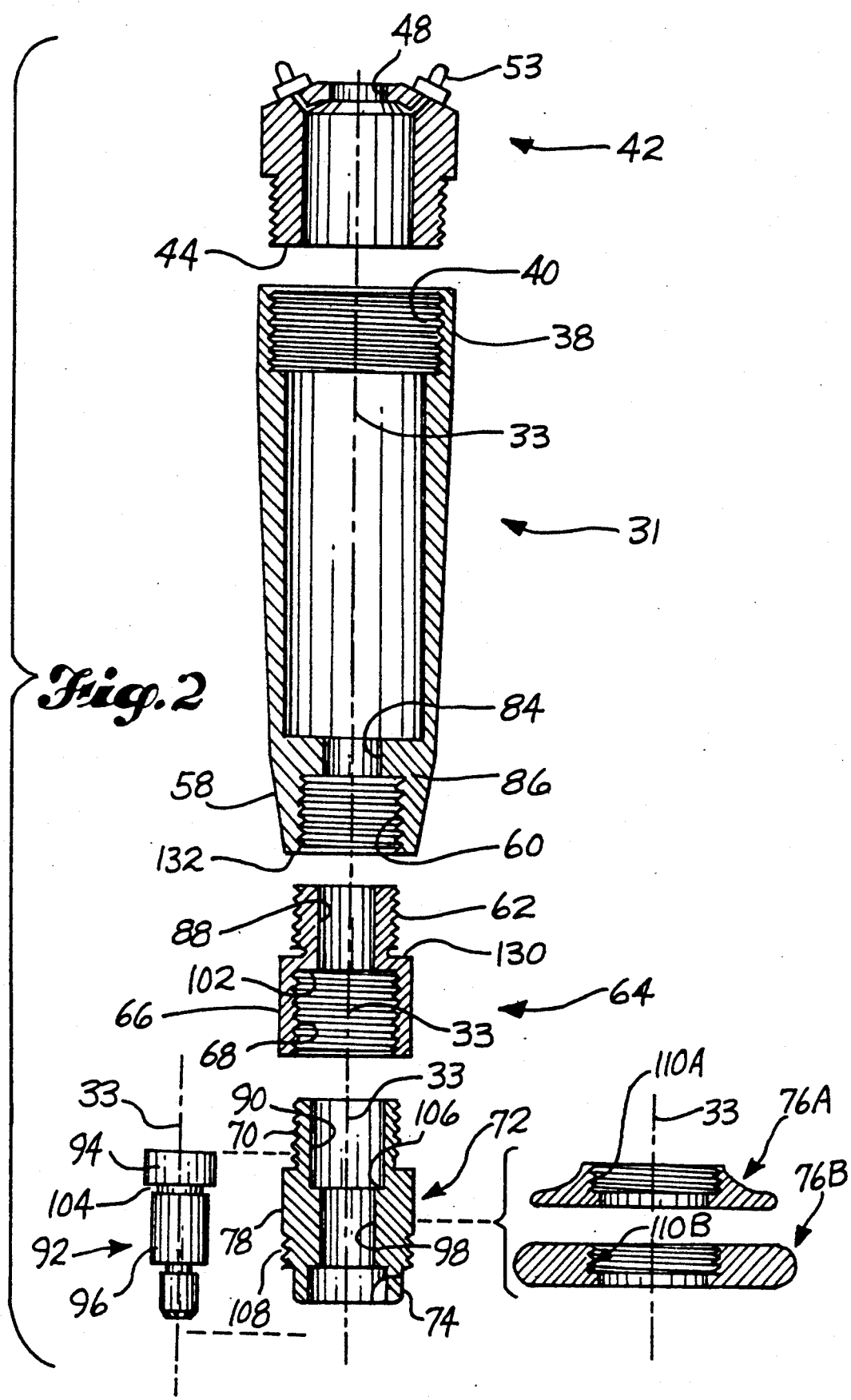
FIG. 2 is an exploded cross sectional elevation of the gauge shown in FIG. 1, with the transducer omitted for clarity of illustration.

Referring now to the drawings wherein like reference characters designate identical or corresponding parts, and more particularly to FIGS. 1 and 2 thereof, a countersink depth measuring gauge 30 according to the invention is shown having a tapered cylindrical case 31 enclosing a cylindrical cavity 32 in which the body 34 of an LVDT 36 is contained. The LVDT used in this preferred embodiment is a Federal Maxum transducer model no. EAS-2104-W1. The case 31 has an upper open end 38 which is internally threaded at 40 and is threadedly engaged with a cap 42 for closing the upper end of the case 31. The cap 42 has a downwardly facing shoulder 44 which engages the top end of the body 34 of the LVDT 36 and holds the LVDT 36 down against the bottom of the cylindrical cavity 32. Preferably the case 31 is made of a tough resilient plastic such as "Delrin", although other materials can be used as well.

The cap 42 has a dome shaped top 46 with a central opening 48 which contains a grommet 50. A cable 52 electrically connects the LVDT 36 to an indicating instrument 54, and the cable 52 passes through the grommet 50 to prevent mechanical damage or abrasion to the cable 52. A set of indicator LED's 53 (shown only in FIG. 2) is mounted on the top of the cap 42 and connected to the instrument 54 by wires 55 (shown only in FIG. 1) which are routed through the cable 52. The instrument 54 includes a digital screen 56 for displaying the results measured by the depth gauge 30. The instrument 54 used in this preferred embodiment is a Federal Maxum digital indicator model no. DEI-72110-D.

The lower end of the case 31 terminates in a tapered portion 58 having an internally threaded opening 60 which receives an externally threaded reduced diameter portion 62 of a cylindrical connector 64. The connector is machined from 6061-T6 aluminum. The external diameter of the main portion 66 of the connector 64 is equal to the external diameter of the lower end of the tapered portion 58 of the case 31 so that the case and the connector 64 blend smoothly for ease and comfort of handling. The exterior surface of the main portion 66 of the connector 64 is lightly knurled to provide a secure grip by the fingers of the operator.

The lower end of the connector 64 has an internally threaded cylindrical opening 68 which receives an externally threaded reduced diameter portion 70 of a foot 72. Preferably, the foot 72 is machined from 4340 stainless steel. The lower end of the foot 72 terminates in a cylindrical contact ring 74 for contacting a workpiece and establishing a reference from which the countersink depth is measured, as will be described below.

A donut-shaped finger grip 76 shown in FIG. 1, is threaded onto the main cylindrical portion 78 of the foot 72 to provide a ledge on which the fingers of the operator can bear while holding the depth gauge down against the surface of the workpiece. Another form of finger grip, a ball grip 76B, is shown in FIG. 2. Both grips are easily removable and may be used alternately or not at all according to the personal preference of the operator. The finger grips are machined from Lexan polycarbonate.

The external diameter of the main portion 78 of the foot 72 is equal to the external diameter of the main portion 66 of the connector 64 so that the depth gauge presents a continuous cylindrical surface at its lower end. The exterior surface of the main portion 78 of the foot 72 is lightly knurled like the exterior surface of the main portion 66 of the connector 64 to provide a secure grip by the fingers of the operator.

The LVDT 36 has a depending cylindrical stud 80 in which an axially slidable contact tip 82 is mounted and connected to an internal electrical component which moves within the body 34 of the LVDT 36 to provide an electrical signal indicative of the axial position of the contact tip 82. The depending cylindrical stud 80 of the LVDT 36 extends through a hole 84 in a floor 86 underlying the cylindrical cavity 32 of the cylindrical case 31. The reduced diameter portion 62 of the cylindrical connector 64 has an axial bore 88 which has the same internal diameter as the hole 84. The hole 84 and the bore 88 receive the cylindrical stud 80 of the LVDT and protect it from damage during use on the factory floor.

The foot 72 has an upwardly opening axial well 90 having an internal diameter greater than the internal diameter of the axial bore 88 in the connector reduced diameter portion 62. A probe 92, machined from tool steel, is slidably mounted in the foot 72 and has a cylindrical upper portion 94 having a diameter sized to fit snugly and slide smoothly in the axial well 90 of the foot 72. A central main cylindrical portion 96 of the probe 92 has a diameter sized to fit snugly and slide smoothly in an axial bore 98 through the main portion 78 of the foot 72. The diameter of the axial bore 98 in the foot 72 is equal to the diameter of the axial bore 88 in the connector 64 and the axial hole 84 in the floor 86 although it is not necessary that they be equal in diameter provided that the diameter of the axial well 90 in the foot 72 be larger than both the axial bore 98 and the axial bore 88. The effect of a larger diameter axial well 90 than the axial bores 98 and 88 serves to trap the probe 92 and its biasing spring 100 within the cylindrical connector 64 and the foot 72 when those two parts are screwed together. This minimizes the chance of loose parts becoming lost during use, as will be explained in more detail below.

Figure 5:
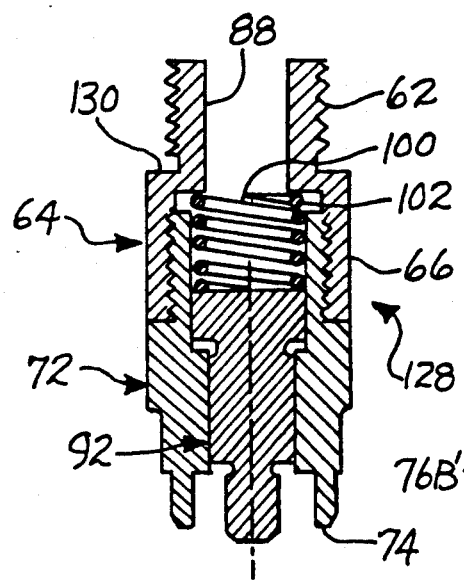
FIG. 5 is a cross sectional elevation of the probe assembly of FIG. 1, shown removed and enlarged.

The spring 100 shown schematically in FIG. 1 and more clearly in FIG. 5, bears against the top end of the top portion 94 of the probe 92, and bears at its other end against a shoulder 102 created between the axial bore 88 and the internally threaded opening 68 in the connector 64. The spring has the effect of exerting a downward bias against the probe 92 to bottom a shoulder 104 between the top portion 94 and the central portion 96 of the probe 92 against a shoulder 106 formed at the junction of the axial well 90 and the axial bore 96 in the foot 72. In use, the shoulder 104 of the probe 92 will be lifted off of the shoulder 106 of the foot 72 and the extent of that lifting will be indicated by the retraction of the axially slidable contact tip 82 of the LVDT 36, as will be explained in more detail below.

The lower end of the main portion 78 of the foot 72 is externally threaded at 108 to receive a selected one of two or more of the previously mentioned grip rings 76. The grip rings have a axial hole 110 therethrough which is internally threaded to threadedly engage the threads 108 on the foot 72. The removable nature of the grip rings 76 enables the operator to select the grip ring which is most comfortable for his finger size and shape, and also enables the grip rings to be removed altogether if the hole to be measured is in a confined position and the grip rings would interfere with closely adjacent structure.

The travel of the contact tip 82 of the LVDT 36 is relatively limited so it is desirable that the center of the LVDT tip travel be located at the position on the top of the probe 72 when the tip of the probe 72 is centered in a rivet hole countersink of the correct depth. In this way, there is assurance that the gauge will measure the countersink depth, either too deep or too shallow, with accuracy.

In order to locate the LVDT 36 in the cavity 32 of the case 31 so that the tip 82 is properly positioned, a shim 112 is positioned at the lower end of the body 34 of the LVDT 36 on the floor 86 of the case 31. The thickness of the shim 112, which is simply a flat bronze washer, is established by placing the instrument without a shim on a set block 114 which has an accurately ground countersink 116 of the correct depth. The extension of the tip 82 of the LVDT is then measured on the digital indicator 54, and the thickness of the shim 112 is determined to raise the body 34 of the LVDT to locate the tip 82 of the LVDT at the center of its travel when the tip of the probe 92 is positioned in a countersink of the correct depth.

Figure 3:
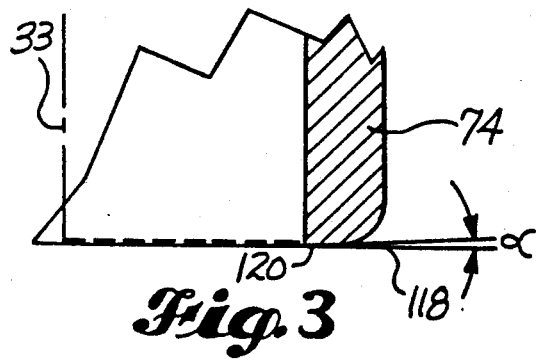
FIG. 3 is enlarged cross sectional elevation of a portion of the contact ring surrounding the probe shown in FIG. 1.

The lower end of the cylindrical contact ring 74 of the foot 72, as shown in the detail of FIG. 3, is provided with a radius 118 at its outer peripheral circumference, and the bottom face of the lower end of the contact ring 74 is ground at a slight taper of about 3 degrees, to provide a single annular point of contact 120 at the inner peripheral edge of the contact ring 74. This insures that the contact ring 74 will sit flat against the surface of the workpiece and has no sharp corners which could mar the finish of the workpiece.

Figure 4:
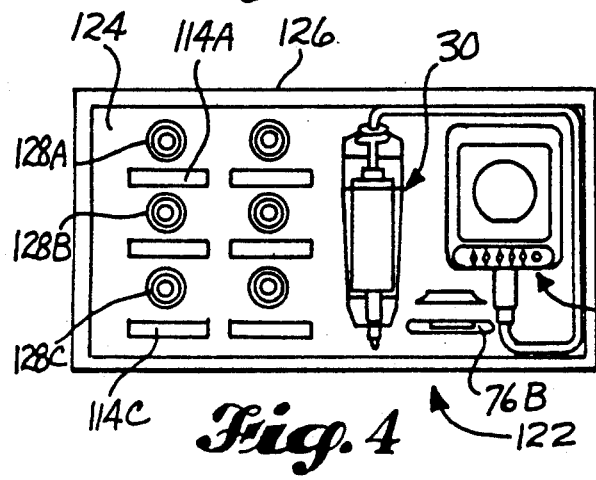
FIG. 4 is a plan view of a storage box holding the gauge and indicator shown in FIG. 1 along with six probe assemblies and set blocks for a variety of fastener hole sizes.

A storage 122 an box for the instrument and its parts as shown in plan view n FIG. 4, includes an EVA foam block 124 having recesses in the shape of the several components of the system for holding these components. The foam block 124 is contained within a sturdy wooden box 126 having a hinged lid (not shown) with a matching foam block in the lid to hold the components in their recesses when the cover is closed. As can be seen in FIG. 4, a recess is provided for the depth gauge 30 and the digital indicator 54 as well as the cable 52 connecting those two components. Another pair of recesses is provided for the finger grips 76A and 76B for selection as desired by the operator. Six pairs of matching recesses are provided for a set block 114 and a probe assembly 128 for each of six different rivet sizes, typically ranging from ⅛th inch to 9/32 incn nominal rivet size.

Figure 6:
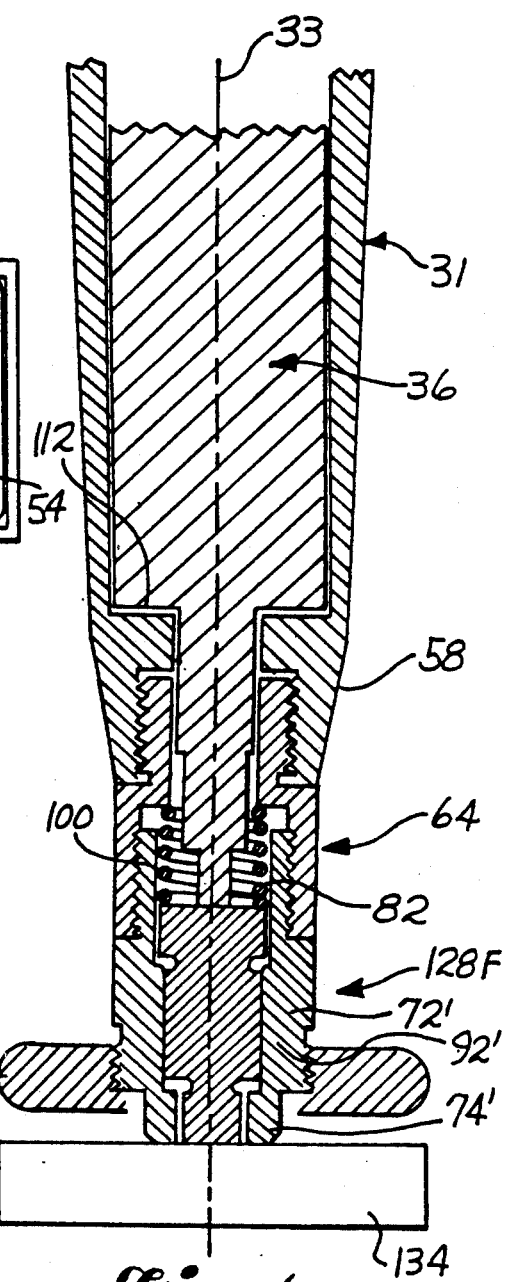
FIG. 6 is a cross sectional elevation of the gauge shown in FIG. 1, with a probe assembly attached for measuring the height of a protruding fastener head.

The probe assembly 128, illustrated in FIG. 6, includes the assembled connector 64 and the foot 72 along with a captured probe 92 and spring 100. These components are permanently assembled so that the small parts do not tend to become lost, although they can be disassembled for cleaning and inspection if desired merely by unscrewing the foot 72 from the connector 64.

After the spacer 112 has been machined to position the LVDT in the case 31 so that its contact tip 82 is located at the center of its stroke when in contact with a probe 92 positioned in a countersink of the correct depth, the probe assemblies 128 can be interchanged by merely unscrewing one from the internally threaded opening 60 in the case 31 and replacing it with another of a different size in the same threaded opening 60. When screwed in fully, a shoulder 130 at the junction of the reduced diameter portion 62 and the main portion 66 of the cylindrical connector 64 abuts against the lower end 132 of the tapered portion 58 of the case 31 so that a fixed reference always exists for positioning the probe assembly 128 in the case 31. In this way, the cylindrical contact ring 74 is always positioned at the same distance axially from the end of the contact tip 82 of the LVDT 36 so that the instrument is accurately repeatable when the probe assemblies 128 are replaced.

Turning now to FIG. 6, an instrument is shown for measuring the flushness (or more precisely, the protrusion) of fastener heads above the surface of the workpiece. This instrument is identical to the depth gauge shown in FIG. 1 with the exception that the foot 72' and the probe 92' are dimensioned to measure the height of a protruding fastener head above the surface of a workpiece. The length of the probe 92' is set so that the position of the contact tip 82 of the LVDT 36 is at its centered position when the tip of the probe 92' is seated on a flat surface and the cylindrical contact ring 74 is in contact with the same flat surface. This corresponds to a perfectly flush fastener head in the workpiece.

In operation, when it is desired to measure the depth of a fastener hole countersink, the size operator determines the size of the fastener and selects the appropriate probe assembly 128 from the storage box 122. That probe assembly 128 is screwed into the end of the internally threaded opening 60 in the case 31 until the distal end 132 of the tapered portion 58 of the case 31 bottoms against the shoulder 130 of the cylindrical connector 64. The operator inserts the tip of the probe 92 into the countersink ground into the matching set block 114 for that probe assembly 128, and he moves the gauge slightly to center it in the hole by watching the screen 56 on the digital indicator 54. The probe 92 is centered in the countersink when the reading on the screen indicates the measurement. After a short period of practice, the operator has no trouble centering the probe in the countersink by merely shifting slightly until the reading is minimum on the screen 56.

At minimum reading, the operator pushes the zero button on the instrument 54 to zero the instrument. Positive readings in the countersink being measured will represent shallow countersink depths and negative readings will represent deep countersink depths. The operator is provided with maximum and minimum dimensions for the countersink for all size fasteners or it may be possible to provide alarm limits in the instrument 54 itself although the Federal Maxum instrument used in the preferred embodiment does not have such alarm limits.

When a hole is detected which is outside of tolerance, it may be redrilled with a new drill if the countersink is too shallow, or, if the countersink is too deep, it must be redrilled with an oversized bit and the next size fastener used. This insures that the material remaining beneath the countersink is thick enough to withstand the stress during the projected lifetime of the structure to resist fatigue cracks.

The operation of the flushness or protrusion gauge shown in FIG. 6 is virtually identical. A probe assembly 128F for measuring the flushness of the fastener head is screwed into the internally threaded opening 60 at the end of the tapered portion 58 of the case 31 until the end 132 of the tapered portion 58 contacts the shoulder 130 of the connector 64. The probe assembly 128F is now pressed against the set block 134 which is simply a flat block, and the zero button on the digital indicator 54 is pushed to zero the instrument at the flat condition.

The cylindrical contact ring 74' is placed on the surface of the workpiece surrounding the fastener head and the probe 92' is pushed up through the foot 72' against its spring 100 an amount equal to the protrusion of the fastener head. That upward movement of the probe 92' is sensed by the tip 82 of the LVDT 36 and an electrical signal corresponding to the fastener head protrusion is generated by the LVDT 36 and displayed on the digital indicator screen 56.

Figure 7:
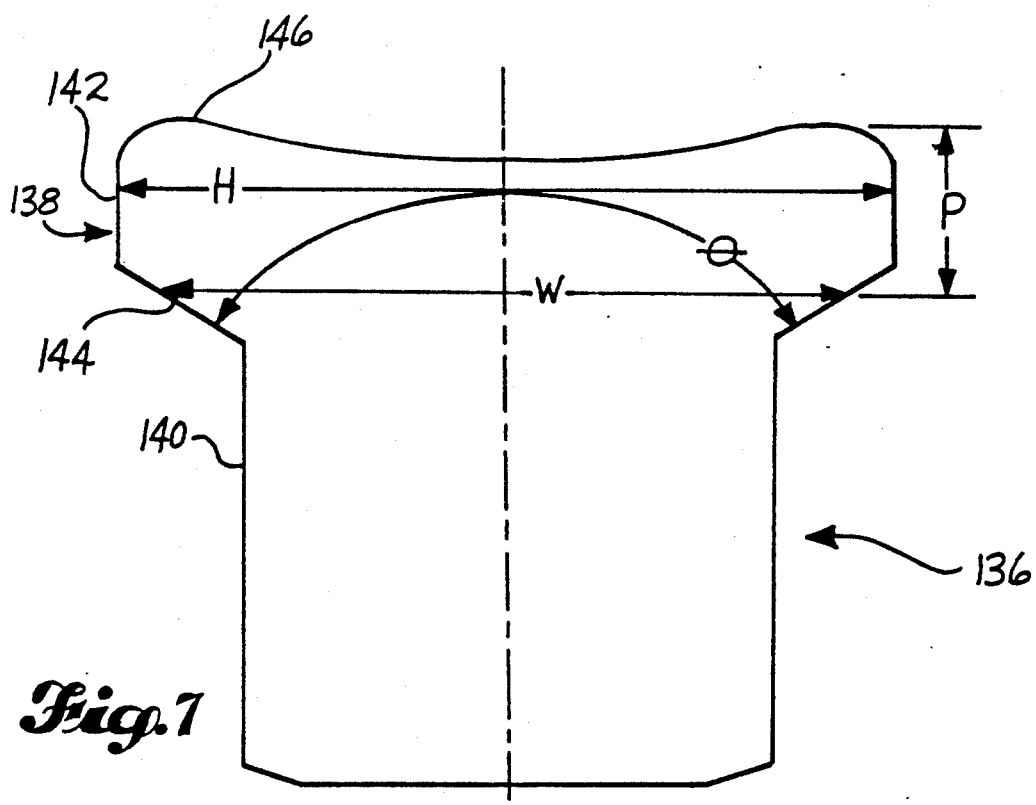
FIG. 7 is an elevation of a Briles rivet for use in a countersunk and counterbored rivet hole; and, FIG. 8 is a cross sectional elevation of a counterbored and countersunk hole for 7, rivet the Briles rivet of FIG. 7, with a measuring probe from FIG. 1 contacting the countersink surface.

Turning now to FIG. 7, a representation of a Briles rivet 136 is shown having a head 138 and a shank 140. The head 138 has a cylindrical portion or barrel 142 and a tapered portion 144. The top of the head 138 has an annular raised rib 146 which provides material to expand radially outward to fill and cold work the hole in which the rivet is installed when the rivet is upset.

The head thickness P of the rivet 136 is based on a reference diameter W which occurs at a point near the intersection of the barrel 142 and the tapered portion 144 of the rivet 136. Although the location of the W diameter is not visually apparent, it is easily located and used for quality inspection by dropping the rivet shank into a hole of diameter W in a inspection device and measuring the head height above the top of the hole.

Figure 8:
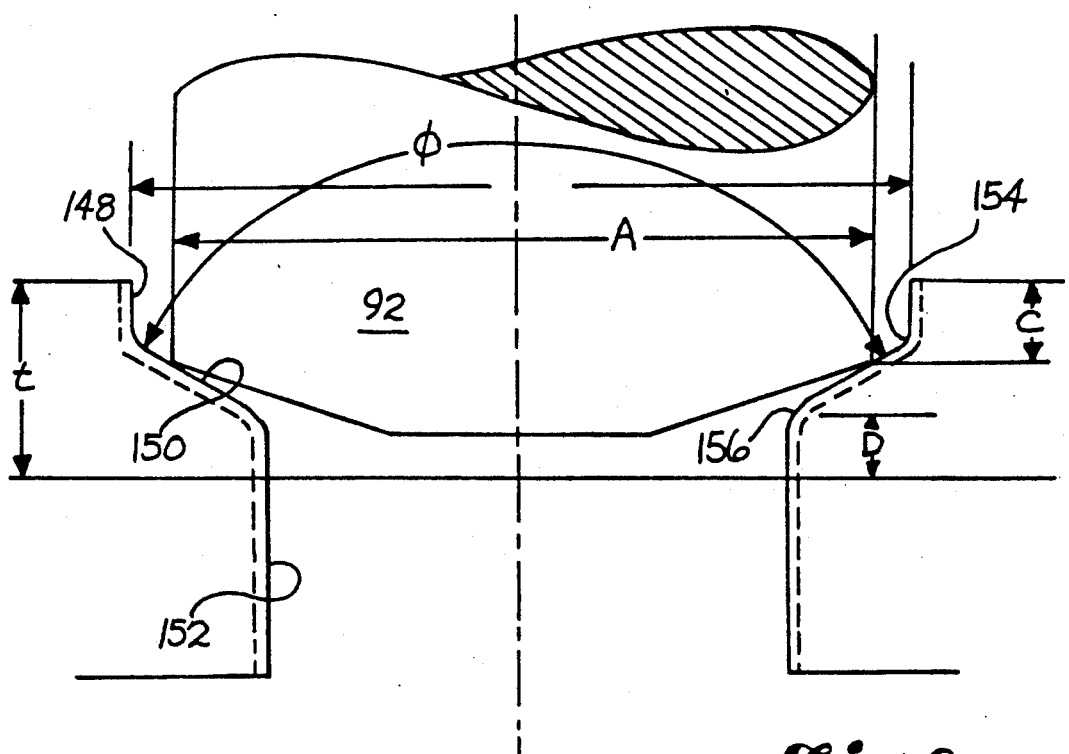

A hole in a representative workpiece is shown in FIG. 8 with a probe 92 extending into the hole for measuring the depth of the countersink. The hole includes a counterbore portion 148 and a tapered countersink 150 which runs into a shank bore 152. The region between the counterbore 148 and the countersink 150 is smoothly tapered with a filet 154 and the corner at the junction of the countersink 150 and the shank bore 152 is rounded with a radius 156. The filet 154 and radius 156 eliminate the possibility of stress risers at what otherwise could be sharp discontinuities of the fastener hole and thereby increase the fatigue resistance of the material in the region of the hole.

The diameter "A" and tolerances of the probe 92 are selected for the particular hole size it is to measure by first establishing the minimum acceptable dimension "D" between the intersection of the countersink 150 and the shankbore 152 which, after cold working, will provide at least the minimum fatigue resistance to prevent fatigue cracks around the rivet hole for the full service lifetime of the airplane. The degree of cold working to which the rivet hole in the workpiece is to be subjected for the desired strengthening and hardening is then used to determine how much the rivet head must protrude above the surface of the workpiece before the rivet is upset, since it is the act of upsetting the rivet in the counterbore 148 and the shankbore 152 that provides the majority of the coldworking of the material around the rivet hole.

Knowing the final coldworked dimensions of the rivet hole, (shown in dotted lines in FIG. 8) one calculates backward to arrive at the dimensions of the hole as drilled, before rivet insertion and upset. The hole dimensions and the skin thickness t at its minimum thickness within tolerance, and the countersink angle $\phi$ now locate the position of the countersink at its maximum acceptable depth. The diameter dimension "A" of the probe 92 and its tolerance are selected to ensure that it engages a bezel area of the countersink surface between the filet 154 and the rounded radius 156 at a radius between the minimum diameter of the counterbore 14 within tolerance and the maximum diameter of the shankbore 152 within tolerance at the maximum and minimum tolerance diameter dimensions of the probe 92.

Obviously, numerous modifications and variations of the disclosed preferred embodiments are possible in view of this specification.

It is therefore expressly to be understood that the manufacture and use of these modifications and variations, and the equivalents thereof, shall be considered within the scope of the invention as defined by the following claims, wherein we claim:

1. A gauge for measuring the depth of a countersink in a workpiece or the protrusion of a fastener head above said workpiece, comprising:

a tubular foot having an axial bore and an annular ring for contacting the surface of said workpiece around said countersink or said fastener head;

a probe mounted in said axial bore of said tubular foot for axial guided sliding movement therein, said probe having a top surface at one end and a tip at the other end thereof;

a transducer having a body and a stud, said stud having a tip which is axially movable along a longitudinal axis relative to said body, said tip having a distal end remote from said body;

said transducer having a sensor for measuring the displacement of said tip relative to said body;

a device for attachment to said transducer to establish a fixed reference location thereon for fixing the position of said transducer relative to said tubular foot;

a connector for removably connecting said tubular foot to said attachment device in such a position that said transducer tip contacts said probe top surface when said probe tip is centered in and contacting said countersink or said fastener head, so that said transducer accurately measures the position of said probe tip relative to said workpiece surface into said countersink or on said fastener head.

2. A gauge as defined in claim 1, wherein:

said axial bore through said foot is stepped in diameter to present an upwardly facing shoulder, and said probe is similarly stepped in diameter to present a downwardly facing shoulder, said shoulders being positioned axially along said bore and said probe so as to engage at an axial projection of said probe in said bore beyond the tolerance depth of said counterbore;

whereby said probe can measure the full range of acceptable countersinks but is retained in said instrument by said shoulders which prevent said probe from falling axially out through said axial bore.

3. A gauge as defined in claim 1, wherein:

said attachment device includes a housing having a body enclosing a cylindrical cavity for receiving said transducer and an axial hole for receiving said transducer stud;

said cavity having a flat floor on which a shim may be placed to raise said transducer to a desired position in said cavity to put said distal end of said transducer tip at the correct position relative to said contact surface of said annular ring.

4. A gauge as defined in claim 3, wherein:

said housing includes a top cap which connects to said housing body and engages said transducer for holding said transducer in position in said cavity.

5. A gauge as defined in claim 4, further comprising:

an instrument for indicating the axial translation of said transducer tip; and an electrical conductor extending between said instrument and said transducer for electrically conducting signals from said transducer to said instrument where said axial translation of said tip can be displayed.

6. A gauge as defined in claim 5, further comprising:
at least one indicator light mounted on said cap and electrically connected to said instrument for indicating desired information concerning the depth of said countersink.

7. A gauge as defined in claim 1, wherein:
a plurality of said feet and matching probes are provided with said gauge for measuring the depth of a plurality of countersinks of different dimensions.

8. A gauge as defined in claim 7, wherein:

said plurality of feet are selectively attachable to said gauge;

whereby said gauge can be used to measure a plurality of countersinks of different sizes by selecting the foot and matching probe for the particular hole size to be measured, and attaching said foot to said connector, leaving undisturbed the pre-established positioning of said transducer with respect to said attachment device.

9. A gauge as defined in claim 1, further comprising:

an annular finger ledge at a lower part of said foot adjacent said annular ring for facilitating the secure and accurate placement and holding of said instrument over said countersink while said measurement is being made.

10. A gauge as defined in claim 9, wherein:

said annular finger ledge is formed as a finger grip separate part from said foot and has an internally threaded axial opening which receives and is threadedly engaged with said lower part of said foot, which is likewise threaded to engage said finger grip threads, whereby said finger grip can be removed and replaced with another finger grip of another design according to the wishes of the user.

11. A probe assembly and attachment structure for attaching said probe assembly to a transducer to constitute a gauge for measuring the depths of a plurality of hole countersinks, each hole having a counterbore and a shank bore on either side of a countersunk in a workpiece for receiving a tapered-head fastener, comprising:

a plurality of cylindrical probes of different sizes, each probe disposed in a central bore of a barrel portion of a tubular foot, each probe having a tip with an outside diameter selected to fall between the diameter of said counterbore at its smallest diameter within tolerance, less the maximum radial extent of any fillet between said counterbore and said countersink, and the diameter of said shank bore at its largest diameter within tolerance, plus the radial extent of any rounded radius between said shankbore and said countersink;

said attachment structure including at least one connector for selectively attaching said tubular feet to said transducer, whereby said probes can be exchanged to fit various sizes of holes and countersinks, and said probes will fit into said counterbores and contact said countersinks under any combinations of dimension tolerance extremes of said counterbore diameter, countersink angle, shank bore diameter, and probe tip diameter so that an accurate measurement of said countersink depth may be taken.

12. A probe assembly as defined in claim 11, further comprising:

a large section on said probe having an enlarged diameter to provide a downwardly facing shoulder, said large diameter section having a flat upper surface to provide a bearing surface against which a displacement transducer can bear during measurement to measure the displacement of said probe when it is positioned with said tip in said countersink.

13. A probe assembly as defined in claim 12, further comprising:

said central bore in said foot having an axial well for slidably receiving said enlarged diameter section of said probe, and a bore for slidably receiving a main portion of said probe, said axial well and said bore forming at a junction therebetween an upwardly facing shoulder which engages said downwardly facing shoulder of said probe to limit the downward sliding movement of said probe in said foot.

14. A probe assembly as defined in claim 13, further comprising:

said connector having a downwardly facing opening and an axial bore, said axial bore having an internal diameter smaller than the external diameter of said probe large diameter section;

whereby said probe is captured within said foot by said connector when said foot and said connector are connected together with said probe in said foot well.

15. A probe assembly as defined in claim 13, further comprising:

a spring between said probe large diameter section and an upper shoulder formed at a junction of said connector opening and connector bore, said spring being compressed between said probe and said upper shoulder to bias said probe downwardly toward engagement of said downwardly facing shoulder of said probe and said upwardly facing shoulder of said foot.

16. A method of measuring the depth of a countersink in a countersunk hole is a workpiece for receiving a fastener having a tapered head, comprising:

selecting a probe having a diameter falling within the inside tolerance limits of a flat tapered bezel area of said hole countersink;

mounting said probe concentrically within a tubular foot so that a tip of said probe protrudes beyond an annular ring at a distal end of said foot;

removably connecting said tubular foot containing said probe to an attachment device for operatively attaching an LVDT transducer to said tubular foot;

placing said annular ring on said workpiece concentrically around said hole;

inserting said probe tip into said countersink and contacting the surface of said countersink with said probe tip;

contacting an upper surface of said probe with a tip of said LVDT transducer to produce an electrical signal in said LVDT which is representative of the depth of penetration of said probe into said countersink;

conducting said electrical signal to a digital indicator to indicate the amount by which said probe extends beyond said annular ring of said foot into said countersink; and moving said tubular foot slightly in a lateral direction to center said probe in said countersink while watching a dial of said digital indicator to obtain the deepest penetration of said prob into said countersink.

17. A method as defined in claim 16, further comprising:

zeroing said instrument, prior to taking said measurement, by placing said annular ring of said foot on a set block concentrically around a reference countersink accurately bored in said set block, and setting said digital indicator to zero at the depth of said probe tip centered in said set block countersink.

18. A method as defined in claim 16, further comprising:

replacing said probe, said foot and a connector for connecting said probe and said foot to said transducer when a different hole size is to be measured.

19. A method as defined in claim 18, further comprising:

capturing said probe within said foot by attaching said connector over a well within said foot, and biasing said probe toward its lowermost position in said well with a spring compressed between said probe and said connector.

20. A gauge for measuring the depth of a countersink in a workpiece or the protrusion of a fastener head above said workpiece, comprising:

a transducer having a body and a stud, said stud having a tip which is axially movable along a longitudinal axis relative to said body, said tip having a distal end remote from said body, said transducer having a sensor for measuring the displacement of said tip relative to said body;

a device for attachment of a connector at a fixed position relative to said transducer to establish a fixed reference location on said connector for fixing the position of said transducer relative to a tubular foot;

said tubular foot having an axial bore and an annular ring for contacting the surface of said workpiece around said countersink or said fastener head;

a probe mounted in said axial bore of said tubular foot for axial guided sliding movement herein, said probe having a top surface at one end and a tip at the other end thereof;

said connector having structure for connecting said tubular foot to said attachment device, and for removing said tubular foot and replacing it with a different size tubular foot without disturbing the position of said attachment device relative to said transducer, said connector having a reference surface thereon to engage a surface of said tubular foot such that said transducer tip contacts said probe top surface when said probe tip is centered in and contacting said countersink or said fastener head, so that said transducer accurately measures the position of said probe tip relative to said workpiece surface into said countersink or on said fastener head.

* * * * *